US005222393A

United States Patent [19]

Ohsawa

[11] Patent Number: 5,222,393

[45] Date of Patent: Jun. 29, 1993

[54] APPARATUS FOR DETECTING COMBUSTION IN AN INTERNAL COMBUSTION ENGINE

[75] Inventor: Toshio Ohsawa, Himeji, Japan

[73] Assignee: Mitsubishi Denki K.K., Tokyo, Japan

[21] Appl. No.: 963,935

[22] Filed: Oct. 20, 1992

Related U.S. Application Data

[63] Continuation of Ser. No. 684,076, Apr. 12, 1991, abandoned.

[30] Foreign Application Priority Data

May 18, 1990 [JP] Japan .................................. 2-126985
Jun. 14, 1990 [JP] Japan .................................. 2-153992

[51] Int. Cl.$^5$ .......................................... G01M 15/00
[52] U.S. Cl. .................................................. 73/117.3
[58] Field of Search .................... 73/116, 117.2, 117.3, 73/35

[56] References Cited

U.S. PATENT DOCUMENTS 3,822,583 7/1974 Keller et al. ............................ 73/35
4,003,248 1/1977 Leichle .................................. 73/116
4,040,294 8/1977 Matsuda et al. .................. 73/117.3
4,478,068 10/1984 Bonitz et al. ............................ 73/35
4,708,113 11/1987 Harada et al. .......................... 73/35
4,762,106 8/1988 Blauhut .

*Primary Examiner*—Robert R. Raevis
*Attorney, Agent, or Firm*—Sughrue, Mion, Zinn, Macpeak & Seas

[57] ABSTRACT

An apparatus for detecting combustion in an internal combustion engine which comprises: a plurality of cylinders wherein an ignition control is performed being synchronized with a revolution number of the internal combustion engine; and an ionic current detector installed at an ignition plug of at least one cylinder of the plurality of cylinders; the ionic current detector including a device for generating a voltage which corresponds to a level of an ionic current generated by the ignition plug, a device for generating a threshold value which is a combustion determining standard, and a comparator which generates an output signal that shows a combustion state, by comparing the voltage with the threshold value; the device for generating a threshold value is composed of a threshold level variable circuit which generates a threshold value corresponding to a running condition of the engine.

2 Claims, 4 Drawing Sheets

APPARATUS FOR DETECTING COMBUSTION IN AN INTERNAL COMBUSTION ENGINE

This is a Continuation of Application No. 07/684,076 filed Apr. 12, 1991, now abandoned.

BACKGROUND OF THE INVENTION

1. Field of the Invention

This invention relates to an apparatus for detecting combustion in an internal combustion engine based on an ionic current generated between gaps of spark plugs, and particularly to an apparatus for detecting combustion in an internal combustion engine which enhances the reliability by changing a threshold value corresponding to a level of the ionic current.

2. Description of the Related Art

Generally speaking, an internal combustion engine utilized in a gasoline engine of automobile, having a plurality of cylinders (for instance four cylinders), is driven by four cycles,; suction, compression, explosion, and exhaust. An electronic calculation s is performed by a microcomputer, to control in optimum an ignition timing of an igniter for each cylinder, a fuel injection order by injectors, and the like. Therefore, the microcomputer, other than various running conditions receives a reference position signal for each cylinder synchronized to a revolution of the internal combustion engine, a cylinder identifying signal corresponding to a specific cylinder, identifies an operational position of each cylinder, and performs a control at an optimum timing. As a means for generating the reference position signal and cylinder identifying signal, a revolution signal generator is utilized, which generates a synchronized signal by detecting revolution of a cam shaft or a crank shaft of the internal combustion engine.

For instance, in the ignition control, it is necessary to combust a mixture by generating a spark at an ignition plug in the mixture compressed by a piston. However, depending on the fuel condition or an ignition device condition, combustion may not take place in the cylinder which is controlled by an ignition control. When this happens, unburnt gas is exhausted and an exhaust catalyst may suffer a failure. Accordingly, to maintain safety of the engine, it is necessary to detect whether combustion takes place, with certainty at each ignition cycle. Formerly, a device was proposed, which determined the combustion state by detecting an ionic current generated in the gap of the ignition plug.

FIG. 1 is a construction diagram showing a general apparatus for detecting combustion in an internal combustion engine.

In FIG. 1, a numeral 1 signifies a crank shaft, which is a driving shaft of an internal combustion engine, and which is driven to rotate by being connected to pistons of a plurality of cylinders (not shown). A numeral 2 signifies a cam shaft which rotates in mesh with the crank shaft 1, a numeral 3, a timing belt which connects the crank shaft 1 and the cam shaft 2.

In case of a general four cycle engine, strokes of suction, compression, explosion and exhaust are performed for two revolutions of the crank shaft 1. One rotation of the cam shaft corresponds to two rotations of the crank shaft 1. The cam shaft 2 rotates by one revolution synchronized with one period of the four cycle motion for each cylinder. In case of a four cycle engine, the motional position of each cylinder has a phase deviation of ½ period of one revolution (180°) with respect to the crank shaft 1, and has a phase deviation of ¼ period with respect to the cam shaft 2.

A numeral 4 signifies a rotational shaft of a rotation signal generator which is connected to the cam shaft 2, a numeral 5, a rotating disk for detecting the reference position, installed at an end of the rotational shaft 4. A numeral 6 signifies a slit-like window formed in the rotating disk 5, which is installed corresponding to the reference position (a predetermined rotation angle) for each cylinder. Moreover, in the rotating disk 5, a cylinder identifying window (not shown) corresponding to a specific cylinder is installed, if necessary.

A numeral 8 signifies a fixed plate juxtaposed to a part of the rotating disk 5. In the fixed plate 8, a photocoupler sensor (not shown) juxtaposed to the window 6, is installed, which generates a reference position signal L for each cylinder. An end at the forward side of the rotational direction of the window 6 corresponds to the first reference position of each cylinder, and another end at the backward side of the rotational direction corresponds to the second reference position. The reference position signal L has a pulse wave pattern which rises at the first reference position, and falls at the second reference position.

A numeral 10 signifies a microcomputer (hereinafter ECU) which comprises an electronic control device. The ECU 10 performs fuel control, and ignition control, and the like of each cylinder, based on the reference position signal L, and running condition signals from various sensors, not shown. The ECU 10 is provided with a distributor means which performs an ignition control for each cylinder following a determined cylinder order.

A numeral 11 signifies a power transistor driven by an ignition signal D from the ECU 10, of which emitter is grounded, a numeral 12, an ignition coil of which primary coil side is connected to the power transistor 11, a numeral 13, an ignition plug which is connected to the secondary coil side of the ignition coil 12, a numeral 14, a diode inserted between the ignition coil 12 and the ignition plug 13, for current reversal prevention. Furthermore, in this explanation, an ignition unit for one cylinder is shown as representative. However this ignition unit is installed for each cylinder.

A numeral 20 is an ionic current detector inserted between an end of the ignition plug 13 and the ECU 10. The ionic current detector 20 is composed of the diode 21 for current reversal prevention, which is connected to an end of the ignition plug 13, the load resistance 22 connected to a cathode of the diode 21, the direct current source 23 connected in series to the load resistance 22, of which anode is grounded, the voltage dividing resistors 24 and 25 connected in parallel to a series circuit composed of the load resistance 22 and the directed current source 23, the condenser 26 inserted between the load resistance 22 and the voltage dividing resistor 24, the comparator 27 of which comparison input terminal (−) is connected to the connection point of the voltage dividing resistors 24 and 25, and of which output terminal is connected to the ECU 10, and the voltage dividing resistors 28 and 29 connected in series between a power supply and ground, which input a threshold value TH to a reference input terminal (+) of the comparator 27 from a medium connection point.

The voltage dividing resistors 24 and 25 constitute a voltage V generating means which generates a voltage corresponding to the ionic current I (ionic current value). The voltage dividing resistors 28 and 29 constitute a threshold generating means which generates a threshold value TH which is a combustion determining standard.

The above ionic current detector 20, depending on the necessity, is installed to the ignition plug 13 of a specific cylinder, or the ignition plug 13 for each cylinder.

Next, explanation will be given to the operation of the combustion detecting apparatus of an internal combustion engine shown in FIG. 1.

When the rotating disk 5 rotates with the cam shaft being coupled with the crank shaft 1, the reference position signal L corresponding to the window 6 is generated from a photocoupler sensor on the fixed plate 8. This reference position signal L has a wave pattern which for instance, rises at the first reference position B75° of each cylinder, and falls at the second reference position B5°. The first reference position B75° is a crank angle position before TDC (top dead center) by 75°, which is equal to a control standard and an initial current flowing angle. The second reference position B5° is a crank angle position of TDC by 5°, which is equaled to an initial ignition position in cranking. A cylinder identifying signal (which can be incorporated in the reference position signal L) is outputted at the generation of the reference position signal L corresponding to a specific cylinder (for instance #1 cylinder).

The reference position signal L is inputted to the microcomputer 10, with running condition signals. As a running condition signal, for instance, an engine (crank) revolution number or a load state (accelerator opening), is inputted.

The microcomputer 10 distributes the ignition signal D to each cylinder identified by the reference position signal L, and makes the power transistor 11 ON in the order of #1 cylinder, #3 cylinder, #4 cylinder and #2 cylinder. The microcomputer 10 after flowing a primary coil current of the ignition coil 12 for a requested time, breaks the power transistor 11, and generates a spark at the ignition plug 13 by driving the secondary coil side of the ignition coil 12. The power source voltage applied to the ignition coil 12, is a negative high voltage, which is broken after the discharge of the ignition plug 13.

When explosion (combustion) is induced in the vicinity of the ignition plug 13 by this discharge, a large quantity of positive ions is generated in the gap of the ignition plug 13. These positive ions become an ionic current I, which flows from the gap of the ignition plug 13, through the diode 21 and the load resistor 22, by the minus voltage of the direct current source 23.

This ionic current I becomes a voltage between both ends of the load resistor 22, is converted to the ionic current value V by the voltage dividing resistors 24 and 25, and is inputted to the comparison input terminal (−) of the comparator 27. The ionic current value V normally, has a high value when explosion takes place, and a low value when explosion does not take place. On the other hand, a threshold value TH which is determined beforehand in a pertinent way, by the voltage dividing resistors 28 and 29, is inputted to the reference input terminal (+) of the comparator 27.

Accordingly, the comparator 27 makes the outputs signal OFF when the ionic current value V is smaller than the threshold value TH, and makes output signal ON when the ionic current value V is equal to or more than the three TH and inputs an ionic current detection value level of high (H) level to the ECU 10, only when the ionic current I of H level is detected.

The ECU 10, based on the cylinder identification from the reference position signal L, and the ionic current detected value, confirms that a normal combustion is carried out in the cylinder which is controlled by an ignition control. When the cylinder which is controlled by an ignition control, is normal, explosion is caused by the discharge of the ignition plug 13, and a large quantity of positive ions is generated at the ignition plug. When explosion does not take place for some trouble, the positive ions are hardly generated. In this way, the combustion state of the cylinder can be determined.

However, noise having a short pulse width is easily superposed on the ionic current value V at an ignition timing or the like, and the level of the ionic current value V is elevated. Accordingly, when determined only by the comparison of the level with the threshold value TH, the comparator 27 may output the ionic current detection value C of H level by the noise. Therefore, actually, a determination may be made in which the normal combustion is carried out, even when combustion does not take place, which causes the aforementioned failure of the engine.

Since in the conventional combustion detecting apparatus for an internal combustion engine, as stated above, the level of the threshold value TH for the determination of the combustion state, is set as constant, when the level of the ionic current I is changed by a running condition, the determination of the ionic current I is not performed accurately, which makes a reliable combustion detection difficult.

Moreover, since in the conventional combustion detection method for the internal combustion engine, as stated above, the combustion is determined when the ionic current value V exceeds the threshold value TH, the determination of the ionic current value V can not be accurately performed, in case that noise having a level which is equal to or more than the threshold value TH, which make a reliable combustion detection difficult.

SUMMARY OF THE INVENTION

It is an object of the present invention to provide an apparatus for detecting combustion in an internal combustion engine which does not destroy a reliability even when the level of the ionic current is changed.

It is an object of the present invention to provide a method of detecting combustion in an internal combustion engine which does not destroy reliability even when noise is superposed on the ionic current value.

According to the present invention, there is provided an apparatus for detecting combustion in an internal combustion engine which comprises: a plurality of cylinders wherein an ignition control is performed being synchronized with a revolution number of the internal combustion engine; and an ionic current detector installed at an ignition plug of at least one cylinder of the plurality of cylinders; said ionic current detector including means for generating a voltage which corresponds to a level of an ionic current generated by the ignition plug, means for generating a threshold value which is a combustion determining standard, and a comparator which generates an output signal that shows a combustion state, by comparing the voltage with the threshold value; said means for generating the threshold value is composed of a threshold level variable circuit which generates a threshold value corresponding to a running condition of the engine.

According to the present invention, there is provided a method of detecting combustion in an internal combustion engine having a plurality of cylinders wherein an ignition control is performed being synchronized with a revolution number of the internal combustion engine, an ionic current detector installed at a plug of at least one cylinder of the plurality of cylinders, and an ECU which determines a combustion state of the cylinder based on an ionic current detection value from the ionic current detector, which comprises steps of: calculating an ionic current detection time between the detection of an edge of an ignition signal of the cylinder and an edge of a next ignition signal of the cylinder by the ECU; and determining the combustion state of the cylinder by comparing the ionic current detection time with a predetermined value by the ECU.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
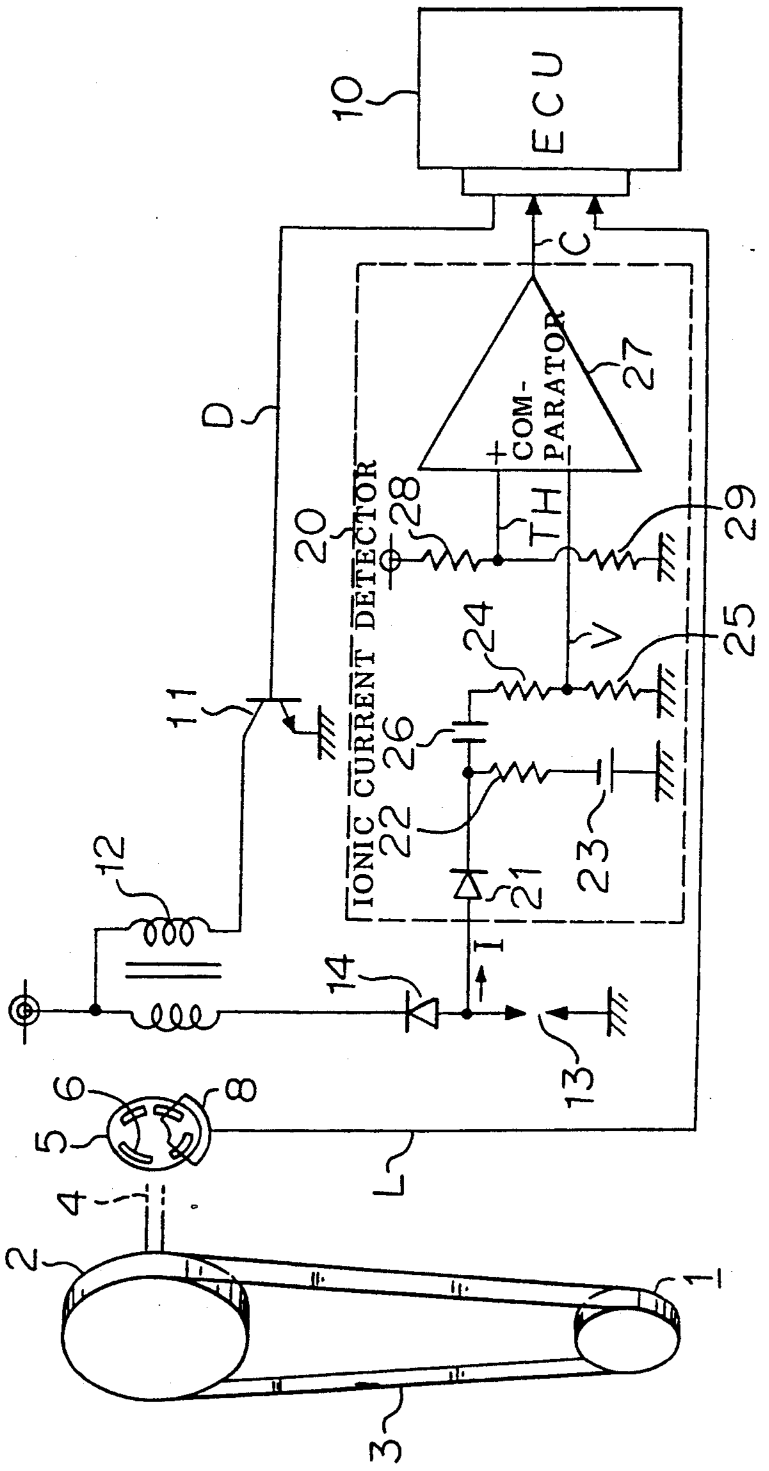
FIG. 1 is a construction diagram showing a apparatus for detecting combustion in an internal combustion engine.
Figure 2:
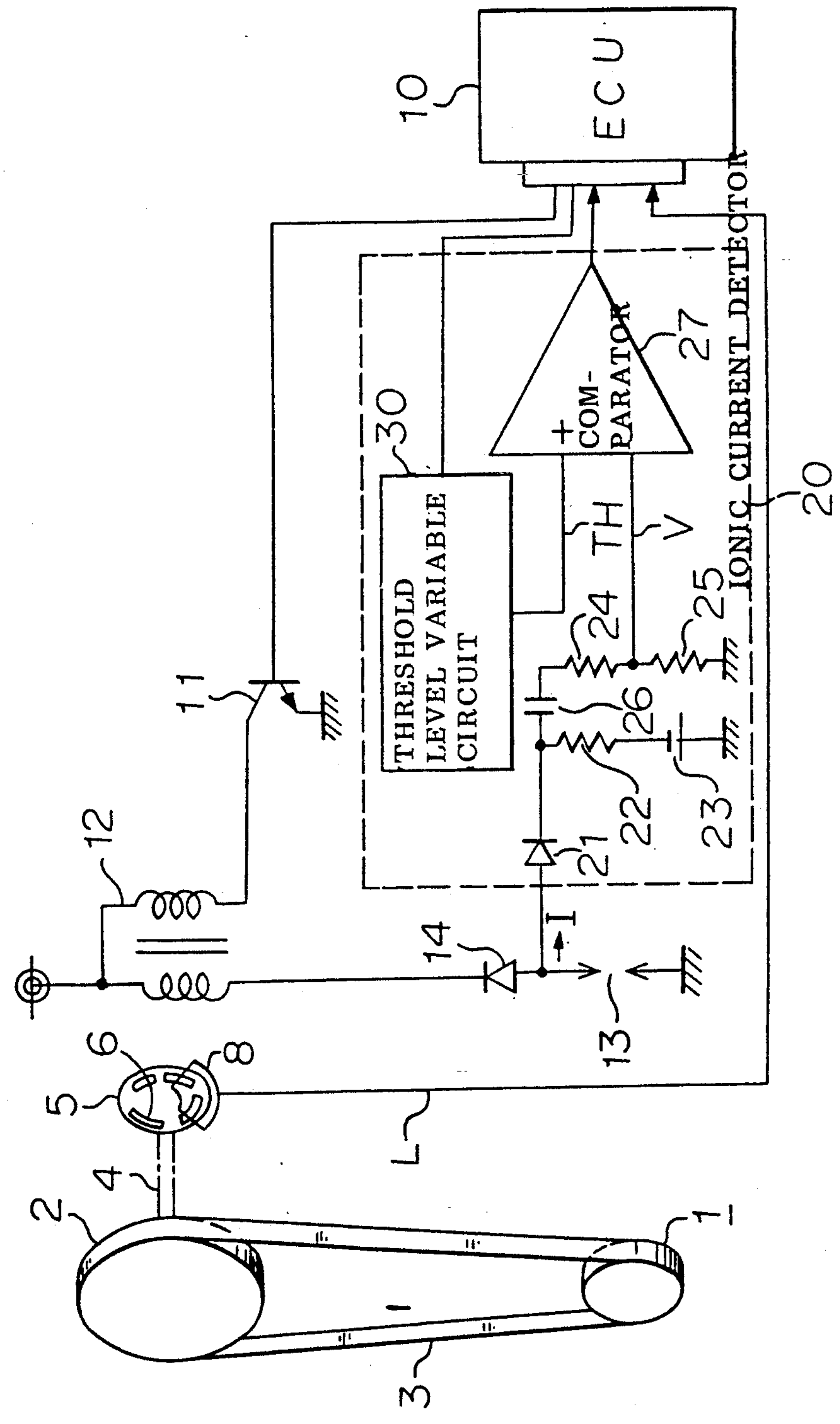
FIG. 2 is a construction diagram showing an embodiment of this invention.

Referring to the drawings, an embodiment of the present invention will be explained. FIG. 2 is a construction diagram showing an embodiment of the combustion detecting apparatus for an internal combustion engine according to the present invention. In FIG. 2, numerals 1 to 27 signify the same or the corresponding parts in FIG. 1.

A numeral 30 signifies a threshold level variable circuit for generating a threshold value, which generates a threshold value corresponding to a running condition of the internal combustion engine by the control of the ECU 10. Furthermore, in the ECU 10, a part of the program is changed, by which the threshold level variable circuit 30 is controlled corresponding to the running condition of the engine.

Next, explanation will be given to the operation of the first embodiment of the invention shown in FIG. 2.

As stated before, ECU 10, based on the reference position signal corresponding to the crank angle of each cylinder, drives the power transistor 11, and lets the ignition plug 13 discharge at a predetermined timing. The ionic current detector 20 just after the discharge, receives the ionic current I generated in the gap of the ignition plug 13. The ECU 10 determines that the level of the ionic current I is a combustion level, by the output signal of the comparator 27.

The ECU controls the threshold level variable circuit 30 corresponding to the revolution number or a load state. The ECU 10 generates a low level threshold value TH, when the running condition of the internal combustion engine is in steady state. The ECU 10 generates a high level threshold value TH when the engine is running at a high revolution number or under heavy load.

In this way, even when the level of ionic current I is changed by the running condition of the engine, the combustion state can be detected with certainty.

Figure 3:
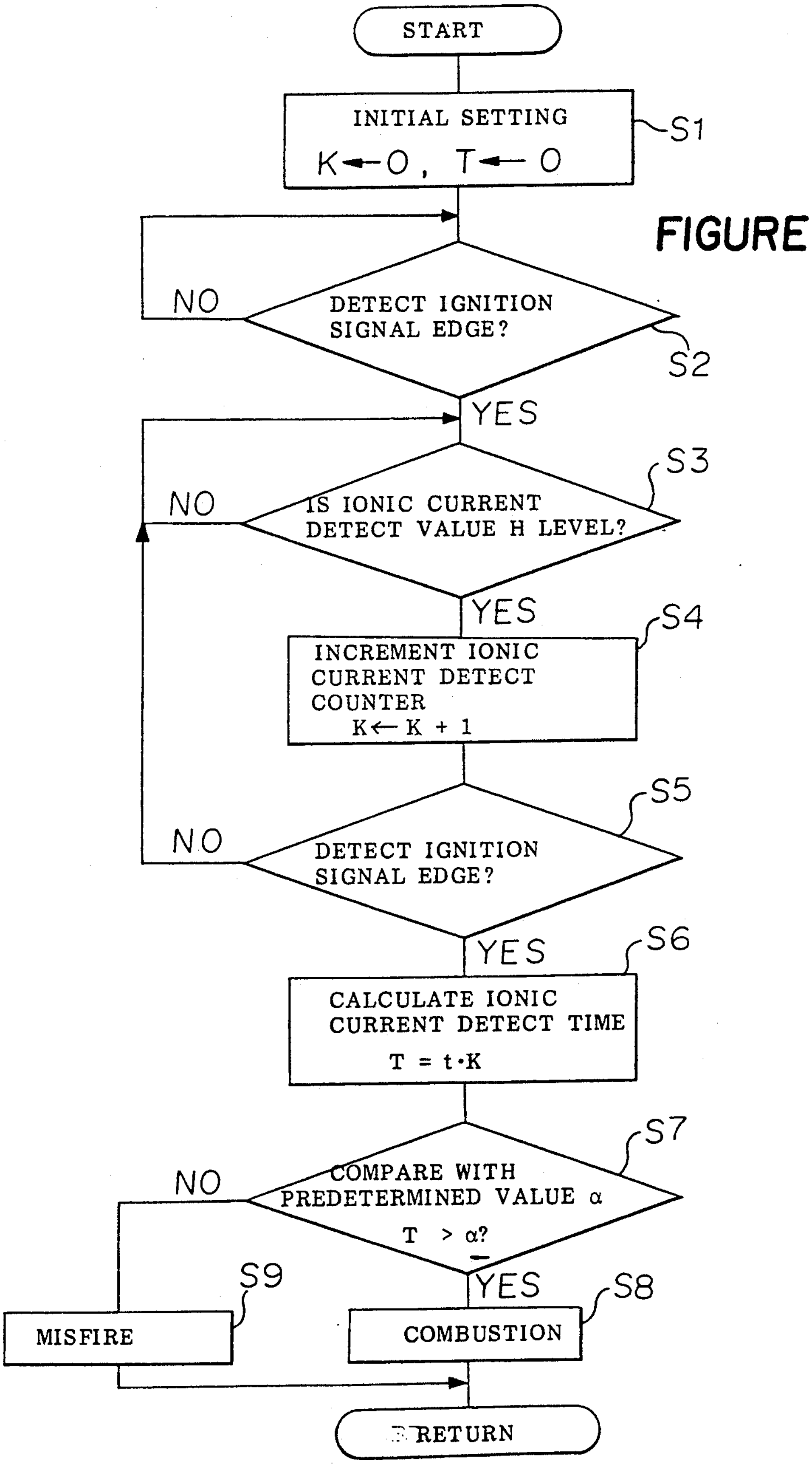
FIG. 3 is a flowchart showing a second embodiment of the invention.
Figure 4:
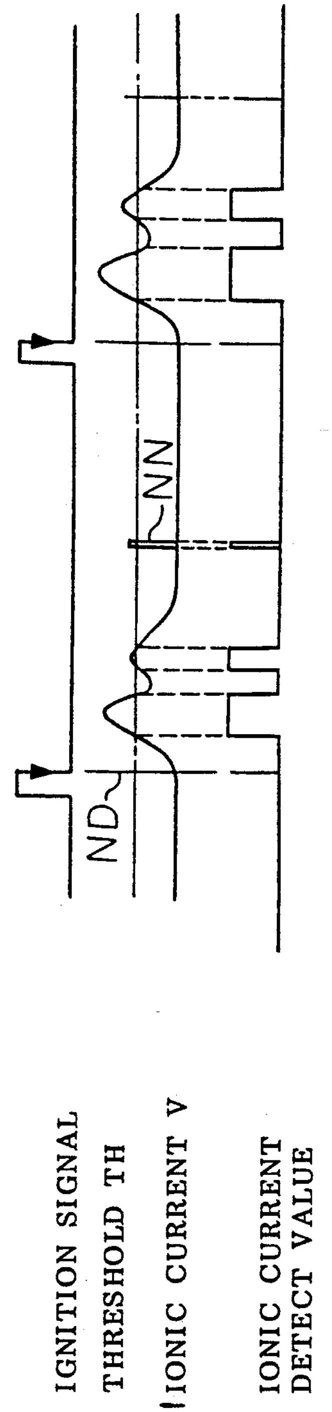
FIG. 4 is a wave pattern diagram explaining the second embodiment of the invention.

Referring to the drawings, a second embodiment of this invention will be explained. FIG. 3 is a flow chart showing an embodiment of a method of detecting compression in an internal combustion engine according to the present invention. FIG. 4 is a wave pattern diagram showing the ignition signal D, the ionic current value V, and the ionic current detection value C. The apparatus to which the embodiment of this invention is applied, is the same with that shown in FIG. 1. However, a part of the program in the ECU 10 is changed.

Next, referring to FIG. 1, FIG. 3, and FIG. 4, explanation will be given to the second embodiment of this invention.

As stated before, the ECU 10, based on the reference position signal L corresponding to the crank angle of each cylinder, drives the power transistor 11, and lets the ignition plug generate discharge at a predetermined timing. The ionic current detector 20 receives the ionic current I which is generated in the gap of the ignition plug 13 just after the discharge, compares the ionic current value V with the threshold value TH by the comparator 27, and outputs the ionic current detection value C.

At this time, the .ECU 10 makes a timewise monitoring of the ionic current detection value C based on the ignition signal D, and determines that is in a combustion state, when the ionic current detection time which is summed up between the ignition signal D and the next ignition signal D, exceeds a predetermined value $\alpha$.

In FIG. 3, first of all, the ionic current detection time T and the counter variable K which is used for the calculation of the ionic current detecting time T, is initialized, and K and T are reset as follows (Step S1).

K=0

T=0

Next, a determination is made on whether a leading edge of of the ignition signal, which is equal to the ignition control timing, is detected (Step S2). At the time when the ignition signal edge is detected, a determination is made on whether the ionic detection value C is H level (Step S3).

When the ionic current detected value C is at H level, the counter value K showing the number of times for detection of ionic current is incremented (Step S4).

When the ionic current detect value C is not at H level, the operation does not proceed from Step S3 to Step S4. Therefore, the counter value K is not incremented and retained. At this point, considering the case in which the ionic current detection value C stays at L level, a time overflow determination step (not shown) may be inserted into the repeat loop of the Step S3, and the operation may be returned when an overflow takes places.

Next, following Step S4, a determination is made on whether the trailing of the next ignition signal T is detected (Step S5). When the next ignition signal edge is not detected, Steps S3 to S5 are repeated.

By these Steps S3 to S5, the substantial ionic current detecting number K between the detection of a signal edge and that of the next ignition signal edge, represent obtained. Steps S3 to S5 is a timer routine repeated at every interval of (m second).

When the detection of the next ignition signal edge is determined and in Step S5, based on the timer time t(m second) and the counter value K, the ionic current detection time T which is summed up during between the two ignition signals D, is calculated by the following equation (Step S6).

$$T=t.K$$

Comparison is made between the ionic current detection time T with a predetermined value $\alpha$ (Step S7). When the ionic current detection time T exceeds the predetermined value $\alpha$, determination is made in which the designated cylinder is in a combustion state (Step S8). When the ionic current detection time T is below a predetermined value $\alpha$ determination is made in which the cylinder is under a misfire (Step S9), and the operation returns.

Normally, even when the peak level of the ionic current value V in combustion time, varies as in FIG. 4, the summation of the time in which the ionic current value V exceeds the threshold value TH, rarely varies, and the total of the pulse width of ionic current detect value C is almost constant.

As stated above, the total time in which the ionic current detection value C shows H level, that is, the ionic current detection time T for every ignition, becomes a very stable value. Accordingly, even when noise with short pulse width is superposed on the ionic current value V, the ECU does not erroneously detects the combustion state, and the highly reliable combustion detection is performed.

Furthermore, the ionic current detected time T in cylinder combustion time, varies with the engine revolution number. Therefore, the predetermined value $\alpha$ may be set to the value ($k.\alpha_{-1}$) which is a preceding value $\alpha_{-1}$ multiplied by the predetermined coefficient k ($<1$). By this method, even when the ionic current detection time T is changed by the running condition of the engine, the combustion state can be detected with certainty.

As stated above, in this invention, a threshold level variable circuit which generates a threshold value corresponding to the running condition of an internal combustion engine, is provided. Therefore, the combustion state can be detected accurately, in spite of the change of the level of the ionic current which is effected in obtaining a highly reliable combustion detection apparatus for an internal combustion engine. Furthermore, in this invention, a step of calculating the ionic current detection time between the detection of the edge of ignition signal and the detection of an edge of the next ignition signal, and a step of determining the combustion of cylinder by comparing the ionic current detection time with a predetermined value, are provided. Furthermore time monitoring is performed for the ionic current detection value, and the combustion state is determined when the ionic current detect time exceeds a predetermined time. Therefore a combustion detection method for an internal combustion engine, is obtained, which does not destroy the reliability even when a noise is superposed on the ionic current value.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for detecting combustion in an internal engine, comprising:

a plurality of cylinders, wherein ignitions control is performed in synchronization with a revolution number of the internal combustion engine; and an ionic current detector installed at an ignition plug of at least one of the plurality of cylinders;

said ionic current detector including means for generating a voltage which corresponds to a level of an ionic current generated by the ignition plug, means for generating a threshold value corresponding to a combustion determining standard, and a comparator for generating an output signal indicative of a combustion state, by comparing the voltage with the threshold value;

said means for generating a threshold value comprising a threshold level variable circuit which generates a threshold value corresponding to a running condition of the engine, wherein said threshold level variable circuit includes means for generating a first threshold value when said engine has steady state running condition, and for generating a second threshold value when said engine has a non-steady stage running condition, said first threshold value being less than said second threshold value.

2. An apparatus according of claim 1, wherein said threshold value generating means increases the threshold value corresponding to the engine revolution number or the engine load.

* * * * *